Patented Apr. 9, 1935

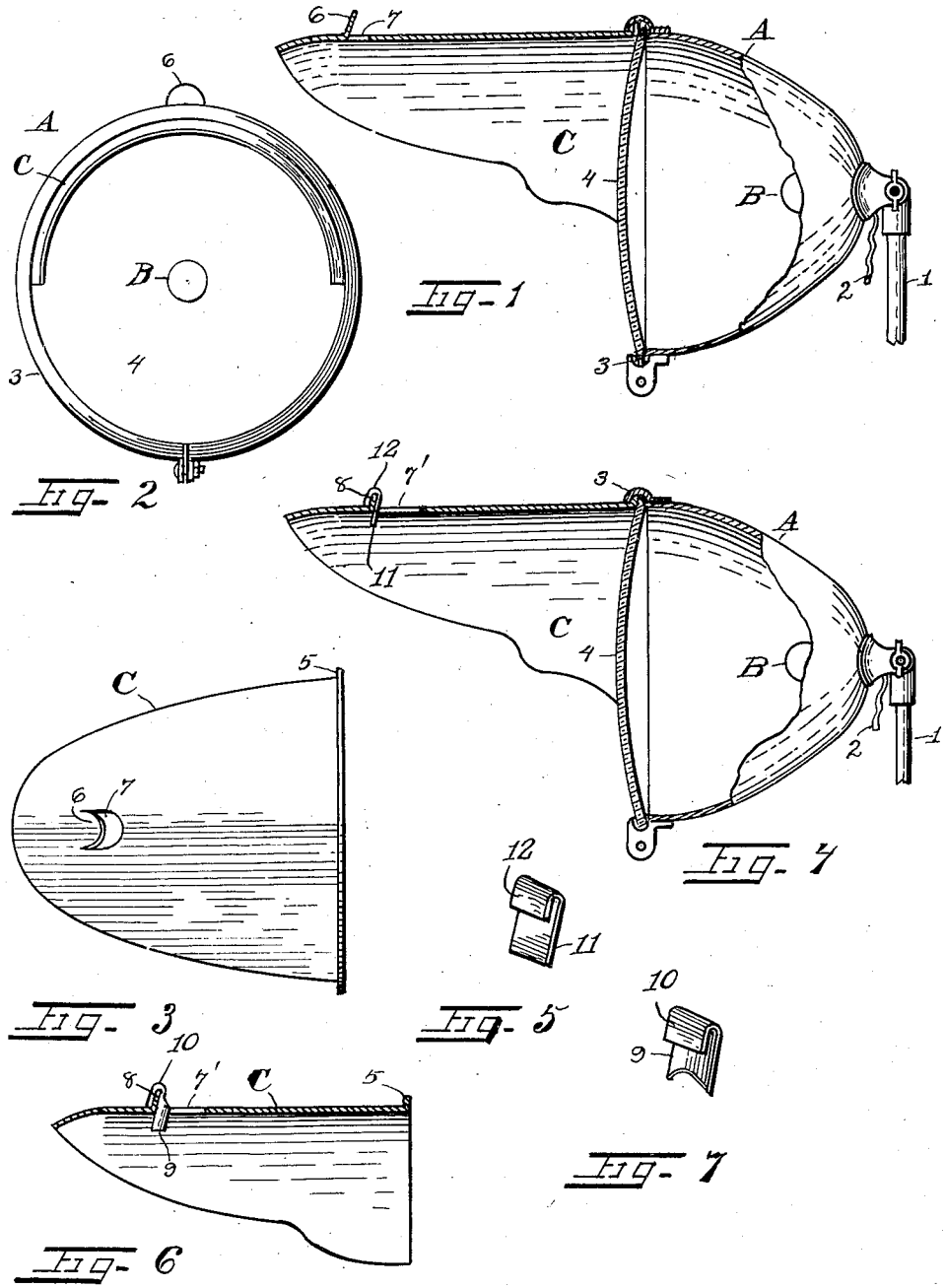

1,997,026

UNITED STATES PATENT OFFICE 1,997,026

DETECTO REFLECTOR FOR MOTOR VEHICLES

Ralph O. Weddel, Battle Creek, Mich.

Application October 20, 1932, Serial No. 638,692

5 Claims. (Cl. 240—8.4)

The invention in the main, consists in having a small reflecting tab forward of a hole in a visor of a motor vehicle lamp and centrally of the top of said visor, the tab slightly being inclined toward the rear of said visor, so that when light from the lamp is reflected through the hole in the visor, it will strike said tab and some illumination will be directed rearwardly into the motor vehicle for the operator's attention.

A characteristic feature of the invention, is to so form the tab or tongue, on the visor whereby the tab will reflect light over both visor and lamp into a motor vehicle, so that when a lamp is not illuminated, the operator of the vehicle may detect that the light is out.

Often it occurs, that when driving motor vehicle in villages and cities, certain ordinances are such, that when lights after dark are out, a fine or imprisonment is liable for the operator of such vehicle.

An important object of the invention is to so form the visor tab or detector on same, whereby the operator of a vehicle will detect whether the light is out or burning, and if out, the operator can immediately stop the vehicle and remedy or restore the lamp to a burning condition.

The invention will be best understood from a consideration of the following detailed description, taken in connection with the accompanying drawing forming a part of the specifications, with the understanding however, that it is not confined to the strict conformity with the showing of the drawing, but may be changed and modified so long as such changes and modifications mark no material departure from the salient features of the invention expressed in the appended claims following the specification.

In the drawing:—

Fig. 1 represents a broken side section of a motor vehicle lamp with a visor equipped with a detecto reflector.

Fig. 2 is a front view of a motor vehicle lamp with the reflector.

Fig. 3 is a plan view of the visor and detecto reflector.

Fig. 4 represents a broken side section of a motor vehicle lamp with a modified detecto reflector upon the visor.

Fig. 5 is a perspective view of the modified form of a detecto reflector, as shown in Fig. 4.

Fig. 6 is a side sectional view of a visor equipped with another modified detecto reflector, and Fig. 7, is a perspective view of the detecto reflector as used in Fig. 6.

In the drawing, A, represents an ordinary head lamp and reflector of a motor vehicle; B, the electrical lamp bulb, and C, a visor placed in alignment above and forward of the lamp.

In the views, 1, is a post to which the lamp is attached, and 2, an electrical conducting cable for operating the lamp bulb. The housing for the bulb is of the usual construction and is equipped with the usual reflector for projecting light rays from the bulb forward of a vehicle.

The visor C, is a concave metallic visor for the purpose, placed with its rounded portion in alignment with the lamp housing and above the lamp, the visor having a semicircular front edge with the side portions sloping downwardly to the rear. The rear edge of the visor having a right angular edge or rim 5, positioned to engage within a concave rib 3, forward of the lens 4, of the lamp. As shown the visor C, is of metal, or equivalent material and has the outwardly extending rib 5, and when placed in position forward of the lamp, a tab 6, or small detecto reflector is situated near the forward end of the top wall of the visor. This reflector 6, as usually formed, is a part of the visor and is stamped therefrom, and forms a semi-circular offset tab, and when punched from the visor leaves a corresponding hole 7, rearward of said tab and toward the front end of the visor. Usually this tab is partially inclined toward the lamp housing, and when the lamp is burning certain light rays will strike the tab from the lamp through the hole 7, and re-act the light beams into the vehicle, where the occupant, or driver of the vehicle can detect whether the lamp is burning or not.

In the Figs. 4, 5, 6, 7, I have shown modified forms of the reflector tabs, in Fig. 4, the usual stamping is formed to make a lip 8, with the customary hole 7', and upon the lip is placed a reflector 11 having a reverse curved upper extremity 12, adapted to hook over the lip 8 with the forward side of the reflector placed so that its lower portion will hang somewhat below the hole 7'. In this instance, the hole is somewhat longer than in Figs. 1, 2 and 3, so that rays striking the lower part of the bottom of the reflector may reflect through said hole into a vehicle.

In Fig. 7 another modification is shown. In this instance at the upper end the reflector is curved and forms a hook 10 and is suspended as is the reflector shown in Fig. 4, but the hole is similar to the hole shown in 4, 5 and 7, in the latter instance, the reflector 9, is somewhat slightly curved in a rearward direction toward the light bulb, and in this instance the hole 7', is somewhat elongated, for the same purpose as is the hole shown in Fig. 4.

Where reflectors, such as shown in the modifications are formed and attached to the tabs 8, soldering or electrical welding of the reflectors should be made to said tabs.

Having therefore described my invention, what I claim as new and desire to secure by Letters Patent, is:—

1. In an automobile headlight, the combination with a casing, a source of light and a concave reflector for projecting the light forwardly, of an upwardly convex visor of substantially cylindrical curvature and open at its ends, the rear end extending downwardly at the sides and attached to the periphery of the casing, a tab formed integral with the visor and extending upwardly from the upper central surface thereof, and an opening in the visor directly in the rear of the tab, the rear surface of the tab being made reflective whereby a portion of the forwardly directed light passes through the opening and is reflected back to the driver of the automobile.

2. A visor for a headlight, said visor being substantially cylindrical in curvature, open at both ends, the sides at the rear end extending downwardly and provided with an outwardly extending flange, said visor tapering toward the forward end, a portion at the forward end being slightly curved downwardly, and a tab on the upper surface of the visor formed by cutting and bending up the metal of the visor, thereby forming an opening directly in the rear of the tab, said tab being made reflecting on its side next to the opening.

3. In an automobile headlight, the combination with a casing, a source of light and a concave reflector for projecting the light forwardly, of an upwardly convex visor of substantially cylindrical curvature and open at its ends, the rear end extending downwardly at the sides and attached to the periphery of the casing, a tab extending upwardly from the upper central surface of the visor, and an opening in the visor directly in the rear of the tab, the rear surface of the tab acting to reflect a portion of the forwardly directed light passing through the opening back to the driver of the automobile.

4. A visor for a headlight, said visor being substantially cylindrical in curvature, open at both ends, the sides at the rear end extending downwardly and provided with an outwardly extending flange, said visor tapering toward the forward end, and a tab on the upper surface of the visor formed by cutting and bending up the metal of the visor, thereby forming an opening directly in the rear of the tab, said tab acting as a reflector at its side next to the opening.

5. In an automobile headlight, the combination with a casing, a source of light and a concave reflector for projecting the light forwardly, of an upwardly convex visor of substantially cylindrical curvature and open at its ends and extending forwardly from the upper part of the casing, a tab extending upwardly from the upper central surface of the visor, and an opening in the visor directly in the rear of the tab, the rear surface of the tab acting to reflect a portion of the forwardly directed light passing through the opening back to the driver of the automobile.

RALPH O. WEDDEL.